(12) United States Patent
Nozaki et al.

(10) Patent No.: US 9,485,415 B2
(45) Date of Patent: Nov. 1, 2016

(54) ELECTRONIC CAMERA AND IMAGE PROCESSING APPARATUS

(71) Applicant: NIKON CORPORATION, Tokyo (JP)

(72) Inventors: Hirotake Nozaki, Port Washington, NY (US); Akira Ohmura, Tokyo (JP); Hideya Inoue, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/792,240

(22) Filed: Jul. 6, 2015

(65) Prior Publication Data

US 2015/0312473 A1 Oct. 29, 2015

Related U.S. Application Data

(63) Continuation of application No. 13/632,482, filed on Oct. 1, 2012, now abandoned, which is a continuation of application No. 11/783,198, filed on Apr. 6, 2007, now Pat. No. 8,306,280.

(30) Foreign Application Priority Data

Apr. 11, 2006 (JP) ................................ 2006-109007
Apr. 11, 2006 (JP) ................................ 2006-109008

(51) Int. Cl.
*G06K 9/00* (2006.01)
*H04N 5/232* (2006.01)
(Continued)

(52) U.S. Cl.
CPC ...... *H04N 5/23219* (2013.01); *G06K 9/00295* (2013.01); *H04N 5/232* (2013.01); *H04N 5/23212* (2013.01); *H04N 1/00336* (2013.01); *H04N 2101/00* (2013.01)

(58) Field of Classification Search
None
See application file for complete search history.

(56) References Cited

U.S. PATENT DOCUMENTS 7,139,767 B1 11/2006 Taylor et al.
7,209,163 B1 4/2007 Ono
(Continued)

FOREIGN PATENT DOCUMENTS

EP 1 164 537 A2 12/2001
JP H06-259534 A 9/1994
(Continued)

OTHER PUBLICATIONS

Jul. 24, 2014 Search Report issued in European Patent Application No. 12189992.6.
(Continued)

*Primary Examiner* — Daniel Mariam
(74) *Attorney, Agent, or Firm* — Oliff PLC

(57) ABSTRACT

An electronic camera includes an image pickup device, a memory, a face detecting section, a face recognizing section, and an object specifying section. The image pickup device photo-electrically converts an image of an object into an electric signal and generates an image signal as the electric signal. The memory has recorded registration data representing characterizing points of faces as recognizing targets. The face detecting section detects face areas in a shooting image plane based on the image signal and extracts characterizing points of faces of objects from the face areas. The face recognizing section determines whether or not the face areas are the recognizing targets based on data of the characterizing points corresponding to the face areas and on the registration data. The object specifying section specifies as a main object an object present on nearest side of the electronic camera of objects as the recognizing targets.

4 Claims, 6 Drawing Sheets

(51) Int. Cl.
*H04N 1/00* (2006.01)
*H04N 101/00* (2006.01)

(56) References Cited

U.S. PATENT DOCUMENTS

| | | | |
|---|---|---|---|
| 7,453,506 B2 | 11/2008 | Li | |
| 7,519,200 B2 | 4/2009 | Gokturk et al. | |
| 7,650,020 B2 | 1/2010 | Monro | |
| 7,650,058 B1 | 1/2010 | Garoutte | |
| 7,663,643 B2 | 2/2010 | Shiota et al. | |
| 7,970,240 B1 | 6/2011 | Chao et al. | |
| 7,999,857 B2 | 8/2011 | Bunn et al. | |
| 8,036,430 B2 | 10/2011 | Tokuse | |
| 2001/0044906 A1* | 11/2001 | Kanevsky | G06F 21/32 726/19 |
| 2001/0053292 A1 | 12/2001 | Nakamura | |
| 2002/0015514 A1 | 2/2002 | Kinjo | |
| 2003/0169906 A1 | 9/2003 | Gokturk et al. | |
| 2003/0223006 A1 | 12/2003 | Kito | |
| 2004/0080634 A1 | 4/2004 | Sakamoto et al. | |
| 2004/0207743 A1 | 10/2004 | Nozaki et al. | |
| 2004/0228528 A1 | 11/2004 | Lao | |
| 2004/0239765 A1 | 12/2004 | Kuromatsu | |
| 2005/0200722 A1 | 9/2005 | Ono | |
| 2006/0008173 A1 | 1/2006 | Matsugu et al. | |
| 2006/0210124 A1 | 9/2006 | Ishii | |
| 2006/0262187 A1 | 11/2006 | Takizawa | |

FOREIGN PATENT DOCUMENTS

| | | |
|---|---|---|
| JP | H10-197941 A | 7/1998 |
| JP | H10-233929 A | 9/1998 |
| JP | H11-55522 A | 2/1999 |
| JP | 2000-111981 A | 4/2000 |
| JP | 2000-350086 A | 12/2000 |
| JP | 2001-016573 A | 1/2001 |
| JP | 2001-028699 A | 1/2001 |
| JP | 2001-215403 A | 8/2001 |
| JP | 2001-230965 A | 8/2001 |
| JP | 2001-357404 A | 12/2001 |
| JP | 2002-051255 A | 2/2002 |
| JP | 2002-077592 A | 3/2002 |
| JP | 2003-107335 A | 4/2003 |
| JP | 2003-244627 A | 8/2003 |
| JP | 2004-007158 A | 1/2004 |
| JP | 2004-070229 A | 3/2004 |
| JP | 2004-120576 A | 4/2004 |
| JP | 2004-147018 A | 5/2004 |
| JP | 2004-246456 A | 9/2004 |
| JP | 2004-272933 A | 9/2004 |
| JP | 2004-317699 A | 11/2004 |
| JP | 2004-320284 A | 11/2004 |
| JP | 2004-320285 A | 11/2004 |
| JP | 2004-336265 A | 11/2004 |
| JP | 2005-086682 A | 3/2005 |
| JP | 2005-091432 A | 4/2005 |
| JP | 2005-128156 A | 5/2005 |
| JP | 2005-128600 A | 5/2005 |
| JP | 2005-203865 A | 7/2005 |
| JP | 2005-252457 A | 9/2005 |
| JP | 2005-300925 A | 10/2005 |
| JP | 2006-005699 A | 1/2006 |
| JP | 2006-012062 A | 1/2006 |
| JP | 2006-094059 A | 4/2006 |

OTHER PUBLICATIONS

Jul. 25, 2014 Search Report issued in European Patent Application No. 12190016.1.
Partial European Search Report issued in European Patent Application No. 07105899.4 on Dec. 4, 2009.
Japanese Office Action issued in Japanese Patent Application No. 2006-109007 on Dec. 8, 2009 (with translation).
Japanese Office Action issued in Japanese Patent Application No. 2006-109008 on Dec. 8, 2009 (with translation).
Office Action issued in Japanese Patent Application No. 2006-109008, on Mar. 16, 2010 (with translation).
Office Action issued in Japanese Patent Application No. 2006-109007, on Mar. 16, 2010 (with translation).
Japanese Office Action issued in Japanese Patent Application No. 2006-109007 dated Jul. 20, 2010 (with translation).
Notification of Reasons for Refusal dated Nov. 2, 2010 in corresponding Japanese Patent Application No. 2006-109007 (with translation).
Office Action dated Aug. 30, 2011 from Japanese Patent Application No. 2010-024418. (with English language translation).
Aug. 22, 2014 Office Action issued in U.S. Appl. No. 13/632,482.
Mar. 6, 2014 Office Action issued in U.S. Appl. No. 13/632,482.
Aug. 13, 2013 Office Action issued in U.S. Appl. No. 13/632,482.

* cited by examiner

ELECTRONIC CAMERA AND IMAGE PROCESSING APPARATUS

CROSS REFERENCE TO RELATED APPLICATION

This is a Continuation of application Ser. No. 13/632,482 filed Oct. 1, 2012, which is a Continuation of application Ser. No. 11/783,198 filed Apr. 6, 2007, which is based upon and claims the benefit of priority from Japanese Patent Application No. 2006-109007, filed on Apr. 11, 2006 and Japanese Patent Application No. 2006-109008, filed on Apr. 11, 2006, the entire contents of which are incorporated herein by reference.

BACKGROUND OF THE INVENTION

1. Field of the Invention

The present invention relates to an electronic camera and an image processing apparatus having a face recognizing function for a person and so forth.

2. Description of the Related Art

As described, for example, in Japanese Unexamined Patent Application Publication No. Hei 6-259534, a technique of extracting characterizing points of a face of a person from a shooting image and recognizing the face based on a match rate of face recognizing data of a person to be recognized and the characterizing points has been disclosed.

As a means of improving user-friendliness of an electronic camera and so forth, an electronic camera and an image processing apparatus that specify a person as a main object as the result of a face recognition and perform various types of processes using information about the main object have been demanded.

With respect to a specific method of specifying a main object, a further improvement has been requested from a view point of user-friendliness of an electronic camera and so forth. For example, when objects of a plurality of persons as recognizing targets is shot by an electronic camera having a face recognizing function, there is a situation of which the number of main objects is restricted. In contrast, when objects of a plurality of persons is shot by the electronic camera having the face recognizing function are shot, there may be a situation of which a person that has not been recognized by the face recognizing function needs to be treated as a main object. Thus, it has been demanded to provide an electronic camera and so forth that can flexibly deal with the foregoing situations.

SUMMARY OF THE INVENTION

The present invention is to solve at least one of the problems of the related art. An object of the present invention is to provide an electronic camera and an image processing apparatus having a face recognizing function that have a means of specifying a main object that follows the intension of the user.

Another object of the present invention is to provide an electronic camera and an image processing apparatus that perform various types of processes based on information about a main object specified as a result of a face recognition.

A first aspect of the present invention is an electronic camera, including an image pickup device, a memory, a face detecting section, a face recognizing section, and an object specifying section. The image pickup device photo-electrically converts an image of an object into an electric signal and generates an image signal as the electric signal. The memory has recorded registration data representing characterizing points of faces as recognizing targets. The face detecting section detects face areas in a shooting image plane based on the image signal and extracts characterizing points of faces of objects from the face areas. The face recognizing section determines whether or not the face areas are the recognizing targets based on data of the characterizing points corresponding to the face areas and on the registration data. The object specifying section specifies as a main object an object present on nearest side of the electronic camera of objects as the recognizing targets.

A second aspect of the present invention is an electronic camera, including an image pickup device, a memory, a face detecting section, a face recognizing section, and an object specifying section. The image pickup device photo-electrically converts an image of an object into an electric signal and generates an image signal as the electric signal. The memory has recorded registration data representing characterizing points of faces as recognizing targets. The face detecting section detects face areas in a shooting image plane based on the image signal and extracts characterizing points of faces of objects from the face areas. The face recognizing section determines whether or not the face areas are the recognizing targets based on data of the characterizing points corresponding to the face areas and on the registration data. The object specifying section specifies as a main object an object closest to a center in a shooting image plane in objects of the recognizing targets.

A third aspect of the present invention is an electronic camera, including an image pickup device, a memory, a face detecting section, a face recognizing section, a ranging section, and an object specifying section. The image pickup device photo-electrically converts an image of an object into an electric signal and generates an image signal as the electric signal. The memory has recorded registration data representing characterizing points of faces as recognizing targets. The face detecting section detects face areas in a shooting image plane based on the image signal and extracts characterizing points of faces of objects from the face areas. The face recognizing section determines whether or not the face areas are the recognizing targets based on data of the characterizing points corresponding to the face areas and on the registration data. The ranging section calculates object-distances of individual objects. The object specifying section specifies as main objects an object whose object-distance is different from a reference object-distance of objects of the recognizing targets is within a predetermined range in objects corresponding to the face areas together with the objects as the recognizing objects.

A fourth aspect of the present invention is an electronic camera, including an image pickup device, a memory, a face detecting section, a face recognizing section, a face recognizing section, and an object specifying section. The image pickup device photo-electrically converts an image of an object into an electric signal and generates an image signal as the electric signal. The memory has recorded registration data representing characterizing points of faces as recognizing targets. The face detecting section detects face areas in a shooting image plane based on the image signal and extracts characterizing points of faces of objects from the face areas. The face recognizing section determines whether or not the face areas are the recognizing targets based on data of the characterizing points corresponding to the face areas and on the registration data. The object specifying section specifies as main objects an object apart from objects as the recognizing targets in the shooting image plane within a predetermined range in objects corresponding to the face areas together with the objects as the recognizing targets.

A fifth aspect of the present invention is an electronic camera, including an image pickup device, a memory, a face detecting section, a face recognizing section, and an object specifying section. The image pickup device photo-electrically converts an image of an object into an electric signal and generates an image signal as the electric signal. The memory has recorded registration data representing characterizing points of faces as recognizing targets. The face detecting section detects face areas in a shooting image plane based on the image signal and extracts characterizing points of faces of objects from the face areas. The face recognizing section determines whether or not the face areas are the recognizing targets based on data of the characterizing points corresponding to the face areas and on the registration data. The object specifying section specifies as main objects an object corresponding to the face area whose size is equal to or larger than a predetermined threshold value in objects corresponding to the face areas together with the objects as the recognizing targets.

In the first or second aspect of the present invention, it is preferred that the electronic camera further includes a focusing section which executes a focusing control based on the main objects.

In one of the third to fifth aspects of the present invention, it is preferred that the electronic camera further include a manipulation section which accepts an input from a user. It is also preferred that the object specifying section change an upper limit of a number of objects specified as the main objects based on the input from the manipulation section.

In one of the third to fifth aspects of the present invention, it is preferred that the electronic camera further include a shooting controlling section which detects states of the main objects based on the image signal and controls a shooting operation of the electronic camera based on the states in which the main objects have been detected.

In one of the third to fifth aspects of the present invention, it is preferred that the electronic camera further include an image processing section which performs an image process for data of a shooting image shot by the image pickup device such that the image process for areas corresponding to the main objects is different from that for other areas.

In one of the first to fifth aspects of the present invention, it is preferred that the electronic camera further include an image processing section which generates data of the shooting image based on the image signal and an image file generating section which generates attachment data representing the main objects of the shooting image and an image file correlating the data of the shooting image with the attachment data.

A sixth aspect of the present invention is an image processing apparatus, including a data reading section, a memory, a face detecting section, a face recognizing section, and an object specifying section. The data reading section reads data of a shooting image generated by an electronic camera. The memory has recorded registration data representing characterizing points of faces as recognizing targets. The face detecting section detects face areas from the shooting image and extracts characterizing points of faces of objects from the face areas. The face recognizing section determines whether or not the face areas are the recognizing targets based on data of the characterizing points corresponding to the face areas and on the registration data. The object specifying section specifies as main objects an object apart from objects as the recognizing targets in the shooting image plane within a predetermined range in objects corresponding to the face areas together with the objects as the recognizing targets.

A seventh aspect of the present invention is an image processing apparatus, including a data reading section, a memory, a face detecting section, a face recognizing section, and an object specifying section. The data reading section reads data of a shooting image generated by an electronic camera. The memory has recorded registration data representing characterizing points of faces as recognizing targets. The face detecting section detects face areas from the shooting image and extracts characterizing points of faces of objects from the face areas. The face recognizing section determines whether or not the face areas are the recognizing targets based on data of the characterizing points corresponding to the face areas and on the registration data. The object specifying section specifies as main objects an object corresponding to the face area whose size is equal to or larger than a predetermined threshold value in objects corresponding to the face areas together with the objects as the recognizing targets.

In the sixth or seventh aspect of the present invention, it is preferred that the electronic camera further include an image processing section which performs an image process for the shooting image such that the image process for areas corresponding to the main objects is different from that for other areas.

An eighth aspect of the present invention is an electronic camera, including an image pickup device, a memory, a face detecting section, a face recognizing section, an object specifying section, and a shooting controlling section. The image pickup device photo-electrically converts an image of an object into an electric signal and generates an image signal as the electric signal. The memory has recorded registration data representing characterizing points of faces as recognizing targets. The face detecting section detects face areas in a shooting image plane based on the image signal and extracts characterizing points of faces of objects from the face areas. The face recognizing section determines whether or not the face areas are the recognizing targets based on data of the characterizing points corresponding to the face areas and on the registration data. The object specifying section specifies main objects in the objects corresponding to the face areas as a result determined by the face recognizing section. The shooting controlling section detects states of the main objects based on the image signal and controls a shooting operation of the electronic camera based on the states in which the main objects have been detected.

In the eighth aspect of the present invention, it is preferred that the shooting controlling section control focus based on the main objects.

In the eighth aspect of the present invention, it is preferred that the shooting controlling section detect blurring of the main objects based on the image signal and controls the shooting operation based on states of which the blurring of the main objects has been detected.

In the eighth aspect of the present invention, it is preferred that the shooting controlling section estimate expressions of faces of the main objects based on the image signal and controls the shooting operation based on types of the expressions.

In the eighth aspect of the present invention, it is preferred that the shooting controlling section detect focusing states of a plurality of the main objects based on the image signal and controls a depth of field based on the focusing states.

A ninth aspect of the present invention is an electronic camera, including an image pickup device, a memory, a face detecting section, a face recognizing section, an object specifying section, and an image processing section. The image pickup device photo-electrically converts an image of an object into an electric signal and generates an image signal as the electric signal. The memory has recorded registration data representing characterizing points of faces as recognizing targets. The face detecting section detects face areas in a shooting image plane based on the image signal and extracts characterizing points of faces of objects from the face areas. The face recognizing section determines whether or not the face areas are the recognizing targets based on data of the characterizing points corresponding to the face areas and on the registration data. The object specifying section specifies main objects in the objects corresponding to the face areas as a result determined by the face recognizing section. The image processing section generates data of a shooting image based on the image signal and performs an image process for the shooting image such that the image process for areas corresponding to the main objects is different from that for other areas.

In the ninth aspect of the present invention, it is preferred that the image processing section perform a correcting process for edge enhancement such that the correcting process for the areas corresponding to the main objects is different from that for the other areas.

In the ninth aspect of the present invention, it is preferred that the image processing section perform the image process such that characteristics of gradation correction for the areas corresponding to the main objects are different from those for the other areas.

In the ninth aspect of the present invention, it is preferred that the image processing section performs the image process for color saturation such that the color saturation for the areas corresponding to the main objects is different from that for the other areas.

In the ninth aspect of the present invention, it is preferred that the image processing section execute a light volume correcting process which adjusts a gradation of a dark portion or a highlight portion of an image of the areas corresponding to the main objects as a result of an image analysis In the ninth aspect of the present invention, it is preferred that the image processing section perform a noise reduction process such that the noise reduction process for the areas corresponding to the main objects is different from that for the other areas.

In the ninth aspect of the present invention, it is preferred that the image processing section perform a correcting process for red-eye reduction such that the red-eye reduction for the areas corresponding to the main objects is different from that for the other areas.

In the ninth aspect of the present invention, it is preferred that the image processing section perform a correcting process for blurring reduction such that the blurring reduction for the areas corresponding to the main objects is different from that for the other areas.

A tenth aspect of the present invention is an electronic camera, including an image pickup device, a memory, a face detecting section, a face recognizing section, an object specifying section, an image processing section, and an image file generating section. The image pickup device photo-electrically converts an image of an object into an electric signal and generates an image signal as the electric signal. The memory has recorded registration data representing characterizing points of faces as recognizing targets. The face detecting section detects face areas in a shooting image plane based on the image signal and extracts characterizing points of faces of objects from the face areas. The face recognizing section determines whether or not the face areas are the recognizing targets based on data of the characterizing points corresponding to the face areas and on the registration data. The object specifying section specifies main objects in the objects corresponding to the face areas as a result determined by the face recognizing section. The image processing section generates data of a shooting image based on the image signal. The image file generating section generates together with attachment data representing the main objects of the shooting image, an image file of which the attachment data are correlated with the data of the shooting image.

An eleventh aspect of the present invention is an electronic camera, including an image pickup device, a memory, a face detecting section, a face recognizing section, an object specifying section, an image processing section, and a printing setting data generating section. The image pickup device photo-electrically converts an image of an object into an electric signal and generates an image signal as the electric signal. The memory has recorded registration data representing characterizing points of faces as recognizing targets. The face detecting section detects face areas in a shooting image plane based on the image signal and extracts characterizing points of faces of objects from the face areas. The face recognizing section determines whether or not the face areas are the recognizing targets based on data of the characterizing points corresponding to the face areas and on the registration data. The object specifying section specifies main objects in the objects corresponding to the face areas as a result determined by the face recognizing section. The image processing section generates data of a shooting image based on the image signal, The printing setting data generating section generates printing setting data with which printing of the shooting image is set based on the main objects specified in the shooting image.

A twelfth aspect of the present invention is an electronic camera, including an image pickup device, a memory, a face detecting section, a face recognizing section, an object specifying section, an image processing section, and a controlling section. The image pickup device photo-electrically converts an image of an object into an electric signal and generates an image signal as the electric signal. The memory has recorded registration data representing characterizing points of faces as recognizing targets and address data used for data communication with persons of the registration data. The face detecting section detects face areas in a shooting image plane based on the image signal and extracts characterizing points of faces of objects from the face areas. The face recognizing section determines whether or not the face areas are the recognizing targets based on data of the characterizing points corresponding to the face areas and on the registration data. The object specifying section specifies main objects in the objects corresponding to the face areas as a result determined by the face recognizing section. The image processing section generates data of a shooting image based on the image signal. The controlling section correlates the address data corresponding to the main objects with the data of the shooting image.

A thirteenth aspect of the present invention is an image processing apparatus, including a data reading section, a memory, a face detecting section, a face recognizing section, an object specifying section, and an image processing section. The data reading section reads data of a shooting image generated by an electronic camera. The memory has recorded registration data representing characterizing points of faces as recognizing targets. The face detecting section detects face areas in a shooting image plane and extracts characterizing points of faces of objects from the face areas. The face recognizing section determines whether or not the face areas are the recognizing targets based on data of the characterizing points corresponding to the face areas and on the registration data. The object specifying section specifies main objects in the objects corresponding to the face areas as a result determined by the face recognizing section. The image processing section performs an image process such that the image process for areas corresponding to the main objects of the shooting image is different from that for other areas.

A fourteenth aspect of the present invention is an image processing apparatus, including a data reading section, a memory, a face detecting section, a face recognizing section, an object specifying section, and a playback controlling section. The data reading section reads data of a shooting image generated by an electronic camera. The memory has recorded registration data representing characterizing points of faces as recognizing targets and playback setting data representing display setting for playback of a shooting image of objects of the registration data. The face detecting section detects face areas in a shooting image plane and extracts characterizing points of faces of objects from the face areas. The face recognizing section determines whether or not the face areas are the recognizing targets based on data of the characterizing points corresponding to the face areas and on the registration data. The object specifying section specifies main objects in the objects corresponding to the face areas as a result determined by the face recognizing section. The playback controlling section obtains the playback setting data corresponding to the main objects and plays back the shooting image based on the playback setting data, A fifteenth aspect of the present invention is an image processing apparatus, including a data reading section. a memory, a face detecting section, a face recognizing section, an object specifying section, and a printing setting data generating section. The data reading section reads data of a shooting image generated by an electronic camera. The memory has recorded registration data representing characterizing points of faces as recognizing targets. The face detecting section detects face areas in a shooting image plane and extracts characterizing points of faces of objects from the face areas. The face recognizing section determines whether or not the face areas are the recognizing targets based on data of the characterizing points corresponding to the face areas and on the registration data. The object specifying section specifies main objects in the objects corresponding to the face areas as a result determined by the face recognizing section. The printing setting data generating section generates printing setting data with which printing of the shooting image is set based on the main objects specified in the shooting image.

A sixteenth aspect of the present invention is an image processing apparatus, including a data reading section, a memory, a face detecting section, a face recognizing section, an object specifying section, and a controlling section. The data reading section reads data of a shooting image generated by an electronic camera. The memory has recorded registration data representing characterizing points of faces as recognizing targets and address data used for data communication with persons of the registration data. The face detecting section detects face areas in a shooting image plane and extracts characterizing points of faces of objects from the face areas. The face recognizing section determines whether or not the face areas are the recognizing targets based on data of the characterizing points corresponding to the face areas and on the registration data. The object specifying section specifies main objects in the objects corresponding to the face areas as a result determined by the face recognizing section. The controlling section correlates the address data corresponding to the main objects with the data of the shooting image.

A seventeenth aspect of the present invention is an image processing apparatus, including a data reading section, an object specifying section, and an image processing section. The data reading section reads an image file of which data of a shooting image generated by an electronic camera and attachment data representing main objects in the shooting image specified in a face recognizing process by the electronic camera have been correlated. The object specifying section specifies the main objects in objects of the shooting image based on the attachment data. The image processing section performs an image process such that the image process for areas corresponding to the main objects in the shooting image is different from that for other areas.

An eighteenth aspect of the present invention is an image processing apparatus, including a data reading section, a memory, an object specifying section, and a playback controlling section. The data reading section reads an image file of which data of a shooting image generated by an electronic camera and attachment data representing main objects in the shooting image specified in a face recognizing process by the electronic camera have been correlated. The memory has recorded playback setting data representing display setting for playback of the shooting image containing registered persons. The object specifying section specifies the main objects in objects of the shooting image based on the attachment data. The playback controlling section plays back the shooting image based on the playback setting data corresponding to the registered persons when the main objects match the registered persons.

A nineteenth aspect of the present invention is an image processing apparatus, including a data reading section, an object specifying section, and a printing setting data generating section. The data reading section reads an image file of which data of a shooting image generated by an electronic camera and attachment data representing main objects in the shooting image specified in a face recognizing process by the electronic camera have been correlated. The object specifying section specifies the main object in objects of the shooting image based on the attachment data. The printing setting data generating section generates printing setting data with which printing of the shooting image is set based on the main objects specified in the shooting image.

A twentieth aspect of the present invention is an image processing apparatus, including a data reading section, a memory, an object specifying section, and a controlling section. The data reading section reads an image file of which data of a shooting image generated by an electronic camera and attachment data representing main objects in the shooting image specified in a face recognizing process by the electronic camera have been correlated. The memory has recorded address data used for data communication with registered persons. The object specifying section specifies the main objects in objects of the shooting image based on the attachment data. The controlling section correlates the address data corresponding to the main objects with data of the shooting image when the main objects match the registered persons.

A twenty-first aspect of the present invention is an electronic camera, including a recognizing unit, a registering unit, and a registration controlling unit. The recognizing unit recognizes, together with a person, an object other than a person. The registering unit registers recognizing data which the recognizing unit uses to recognize the object. The registration controlling unit categorizes together with the recognizing data about the person, the recognizing data about the object other than the person as a group and registers the group. In the twenty-first aspect of the present invention, it is preferred that the object other than the person be an animal.

In the fourteenth to seventeenth aspects of the present invention, it is preferred that the image processing section perform the same image process as does the image processing section of the ninth aspect of the present invention. In addition, the structures of the thirteenth to twentieth aspects of the present invention may be effectively embodied as methods, record mediums, computer programs, and so forth.

BRIEF DESCRIPTION OF DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED
EMBODIMENTS

Figure 1:
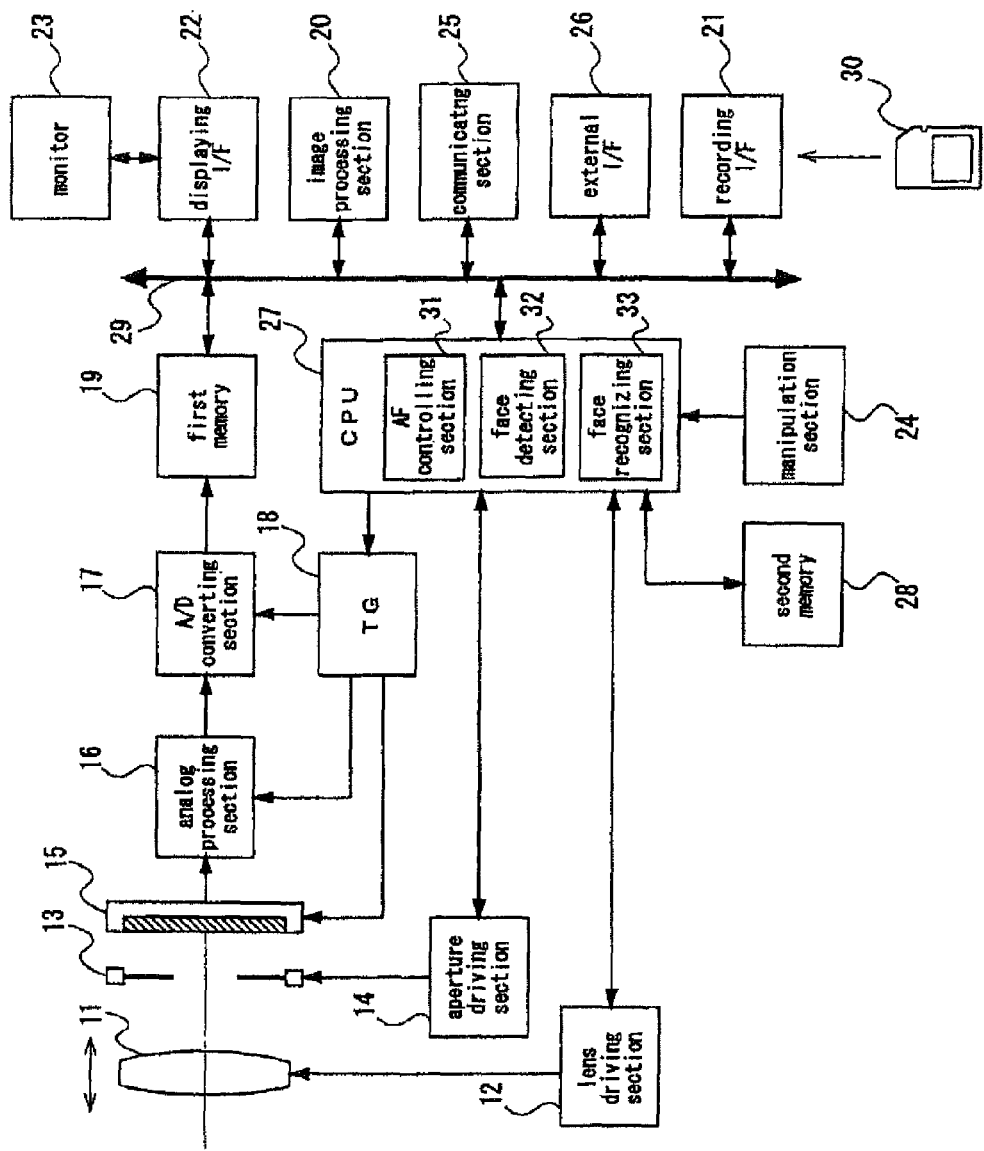
FIG. 1 is a block diagram showing a structure of an electronic camera according to an embodiment of the present invention.

FIG. 1 is a block diagram showing a structure of an electronic camera according to an embodiment of the present invention.

The electronic camera has a shooting lens 11, a lens driving section 12, an aperture 13, an aperture driving section 14, an image pickup device 15, an analog processing section 16, an A/D converting section 17, a timing generator (TG) 18, a first memory 19, an image processing section 20, a recording 1/F 21, a displaying I/F 22, a monitor 23, a manipulation section 24, a communicating section 25, an external I/F 26, a CPU 27, a second memory 28, and a system bus 29. The first memory 19, the image processing section 20, the recording I/F 21, the displaying I/F 22, the communicating section 25, the external I/F 26, and the CPU 27 are connected through the system bus 29.

The shooting lens 11 is composed of a group of a plurality of lenses including zoom lens and a focus lens, which adjusts a focus position. Each lens that composes the shooting lens 11 is moved in an optical axis direction by the lens driving section 12. In addition, the lens driving section 12 has an encoder (not shown) that detects a position in the optical axis direction of the shooting lens 11. An Input and an output of the lens driving section 12 are connected to the CPU 27.

The aperture 13 adjusts an amount of incident light coming from the shooting lens 11. An opening amount of the aperture 13 is adjusted by the aperture driving section 14. An input and an output of the aperture driving section 14 are connected to the CPU 27.

The image pickup device 15 photoelectrically converts a light beam that has passed through the shooting lens 11 into an electric signal and generates an analog image signal of the image of the object. In a shooting mode of which the electronic camera shoots an object, the image pickup device 15 shoots an image to be recorded. In a shooting standby mode, the image pickup device 15 reads an image at intervals of a predetermined time period with pixel skipping read and outputs a moving image. Data of the moving image are used for various types of calculating processes by the CPU 27 and representations displayed on the monitor 23.

The analog processing section 16 is an analog frontend circuit that performs an analog signal process for an output of the image pickup device 15. The analog processing section 16 contains a CDS circuit and a gain circuit. The CDS circuit of the analog processing section 16 reduces a noise component of the output of the image pickup device 15 by correlated double sampling. The gain circuit of the analog processing section 16 amplifies the gain of the input signal under the control of the CPU 27. The gain circuit can adjust shooting sensitivity equivalent to ISO sensitivity.

The A/D converting section 17 converts the analog image signal outputted from the analog processing section 16 into a digital signal. An output of the AID converting section 17 is connected to the first memory 19.

The TG 18 supplies timing pulses to the image pickup device 15, the analog processing section 16, and the A/D converting section 17 under the control of the CPU 27. Timings at which the image pickup device 15, the analog processing section 16, and the A/D converting section 17 are driven are controlled with timing pulses of the TG 18.

The first memory 19 is a buffer memory that temporarily records data of an image before and after image processes (that will be described later) are performed.

The image processing section 20 performs various types of image processes for the digital image signal that has been shot in the shooting mode and generates a shooting image. In addition, the image processing section 20 compresses the data of the shooting image in the PEG format. Moreover, the image processing section 20 generates an image (view image) to be displayed with an image signal of a moving image under the control of the CPU 27 in the shooting mode.

On the other hand, in an editing mode of which the electronic camera for example plays back a shooting image, the image processing section 20 executes a decompressing process for data of the shooting image that has been compressed. In addition, in the editing mode, the image processing section 20 can perform image processes for data of the shooting image. Details of image processes that the image processing section 20 perform will be described later.

The recording I/F 21 has a connecter connected to a record medium 30. The recording I/F 21 executes writing/reading of data of a shooting image to/from the record medium 30 connected through the connector, respectively. The record medium 30 is composed of for example a hard disk or a memory card containing a semiconductor memory. FIG. 1 shows a memory card as an example of the record medium 30.

The displaying I/F 22 controls the display of the monitor 23 under the control of the CPU 27. In addition, the displaying I/F 22 has a video terminal through which an image is output to the outside of the electronic camera. Thus, the electronic camera of this embodiment can cause an external display device (such as a television set) to display a playback image through a video terminal of the displaying I/F 22.

The monitor 23 displays various types of images under the control of the CPU 27 and the displaying I/F 22. The monitor 23 of this embodiment is composed of a liquid crystal monitor. The monitor 23 displays a view image as a moving image in the shooting standby state of the shooting mode. In addition, the monitor 23 can superimpose representations of various types of information that are necessary for shooting (for example, the number of frames that can be shot, the position of a focus detecting area, a frame representation of a face area detected in a face detecting process that will be described later) with a view image using an on-screen function.

In addition, the monitor 23 can display a playback image based on data of a shooting image and a menu screen on which data can be input in the GUI (Graphical User Interface) format (illustrations of the view screen and the menu screen displayed on the monitor 23 are omitted).

The manipulation section 24 has a release button, operation buttons, and so forth. The release button of the manipulation section 24 is used to accept an exposure operation start input from the user. The operation buttons of the manipulation section 24 are used to accept a data input from the user on the foregoing menu screen and so forth and to accept the shooting mode switching input of the electronic camera from him or her.

The communicating section 25 controls communication with an external device based on specifications defined in wireless LAN standard IEEE 802.11. For example, when data of shooting image are transmitted to an external device, the communicating section 25 converts the data of the shooting image into data that are wirelessly communicable and transmits the converted data to the external device.

The external I/F 26 has a connection terminal defined in a serial communication standard such as USB (Universal Serial Bus). The external I/F 26 controls data transmission/reception with for example a computer connected through the connection terminal based on the communication standard.

The CPU 27 controls an operation of each section of the electronic camera according to a sequence program stored in a ROM (not shown). In addition, the CPU 27 executes various types of calculations necessary for shooting and so forth (details will be described later). In addition, the CPU 27 of this embodiment functions as an AF controlling section 31, a face detecting section 32, and a face recognizing section 33.

The AF controlling section 31 executes control of driving a focus lens, a known AF calculation according to a contrast detecting method based on data of a moving image, and so forth. The AF controlling section 31 obtains the position of the focus lens from the lens driving section 12 in the state that each object is focused and calculates object-distances of objects in a shooting image plane.

The face detecting section 32 extracts characterizing points from data of a moving image or a shooting image and detects a face area of each object, the size of each face, and so forth. The face detecting section 32 extracts a face area according to a characterizing point extracting process described, for example, in Japanese Unexamined Patent Application Publication No. 2001-16573. The characterizing points are for example end points of eyebrows, eyes, a nose, and lips, edge points of a face, a vertex point of a head, and lower end point of a chin. The face detecting section 32 can detect faces of animals such as dogs, cats, and birds.

The face recognizing section 33 generates face recognizing data based on the characterizing points detected by the face detecting section 32. The face recognizing section 33 generates face recognizing data of a person as a recognizing target based on for example the positions of the characterizing points of the detected face, the sizes of parts of the face obtained from the characterizing points, the relative distances of the individual characterizing points, and so forth.

In addition, the face recognizing section 33 performs a face recognizing process of determining whether or not the face of a person in the shooting image plane is the face of a person of the face recognizing data. Specifically, the face recognizing section 33 calculates the positions of the characterizing points of the face of each person as an object to be shot, the sizes of the parts of the face of each person, the relative distances of the individual characterizing points based on the characterizing points of the face of each person detected by the face recognizing section 33. Thereafter, the face recognizing section 33 compares the calculated results with the face recognizing data and obtains similarity of the face of each person of the face recognizing data with the face of each person as an object to be shot. When the similarity exceeds a predetermined threshold value, the face recognizing section 33 determines that the person as an object to be shot match the person of the face recognizing data. The CPU 27 specifies a main object (that will be described later) as the result of the face recognition by the face recognizing section 33.

In this embodiment, the face recognizing section 33 can generate face recognizing data of animals in the same manner as those of persons. In addition, the face recognizing section 33 recognizes a face of each animal in the shooting image plane based on the face recognizing data of each animal.

The second memory 28 is connected to the CPU 27. The second memory 28 records the face recognizing data generated by the face recognizing section 33. The second memory 28 can generate group folders for individual persons who have been registered (registered persons) so that the face recognizing data are grouped by registered persons. For example, a plurality of records of face recognizing data that differ in the orientations of the face, shooting conditions, and so forth can be recorded in a group folder for each registered person.

In addition, setting data that represent various types of setting that the CPU 27 applies when the face recognizing section 33 has recognized a registered person can be recorded to each group folder of the second memory 28. Examples of the setting data include (1) playback display setting data, (2) print setting data, (3) transmission setting data.

As (1) playback display setting data, various playback and display operations can be set in the editing mode. When a slide show is displayed, as playback display setting data, for example, a display duration of a shooting image of a registered person, a display pattern, and music performed with an image can be set. As (2) print setting data, for example, presence/absence of generation of print setting data according to the DPOF (Digital Print Order Format)

standard and details of print setting (the number of prints and size) can be set. As (3) transmission setting data, for example, necessity of transmission of a shooting image of a registered person and address data of a recipient (electronic mail address) can be set.

In the foregoing description, it was assumed that face recognizing data of persons are grouped and their group folders are generated. Instead, face recognizing data of animals may be grouped and their group folders may be generated. In addition, setting data of face recognizing data of animals may be recorded in group folders. For example, a dog can be registered to a group folder of "family" of persons who keep the dog.

Figure 2:
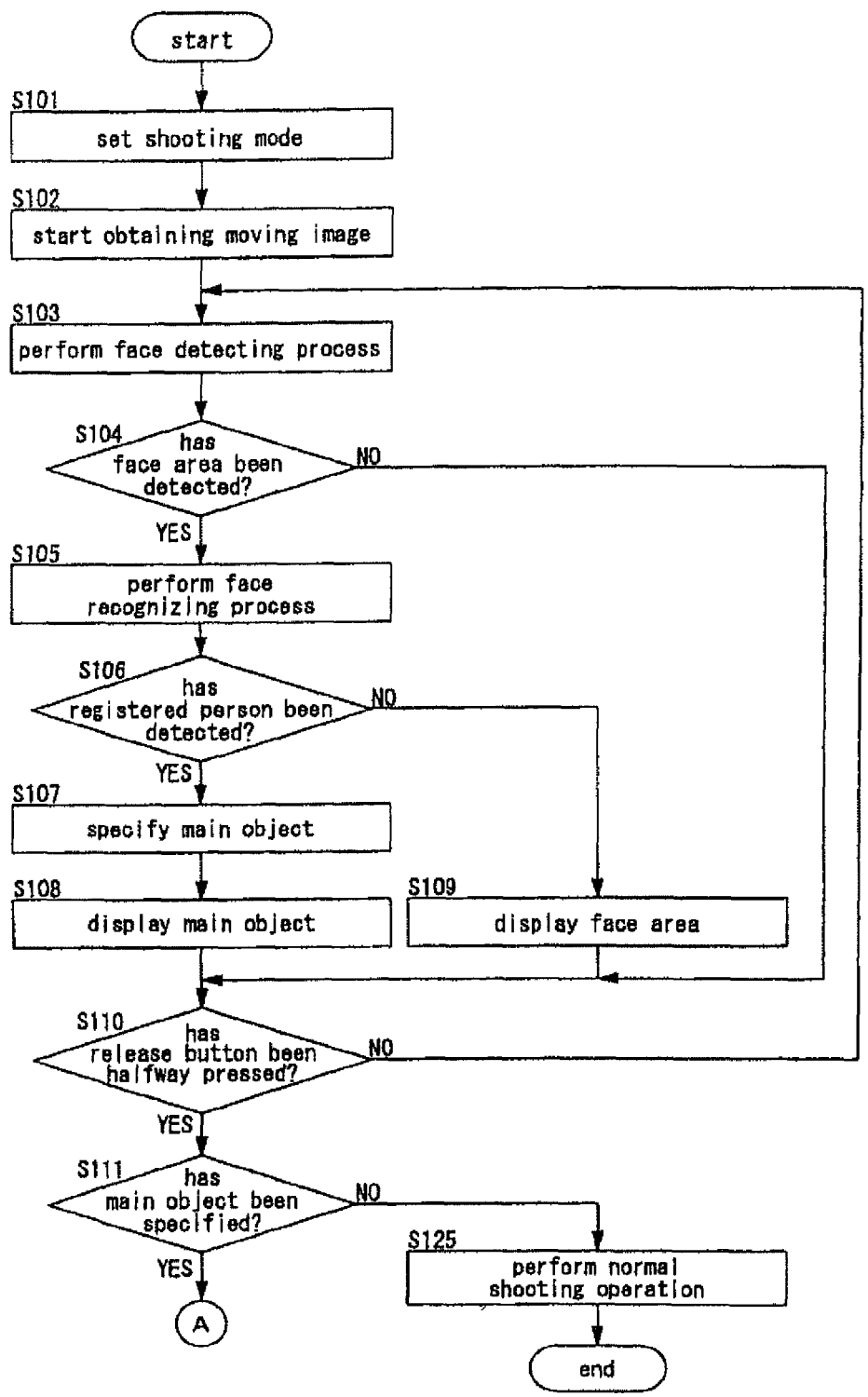
FIG. 2 is a flow chart describing an example of an operation in a shooting mode of the electronic camera according to this embodiment of the present invention.
Figure 3:
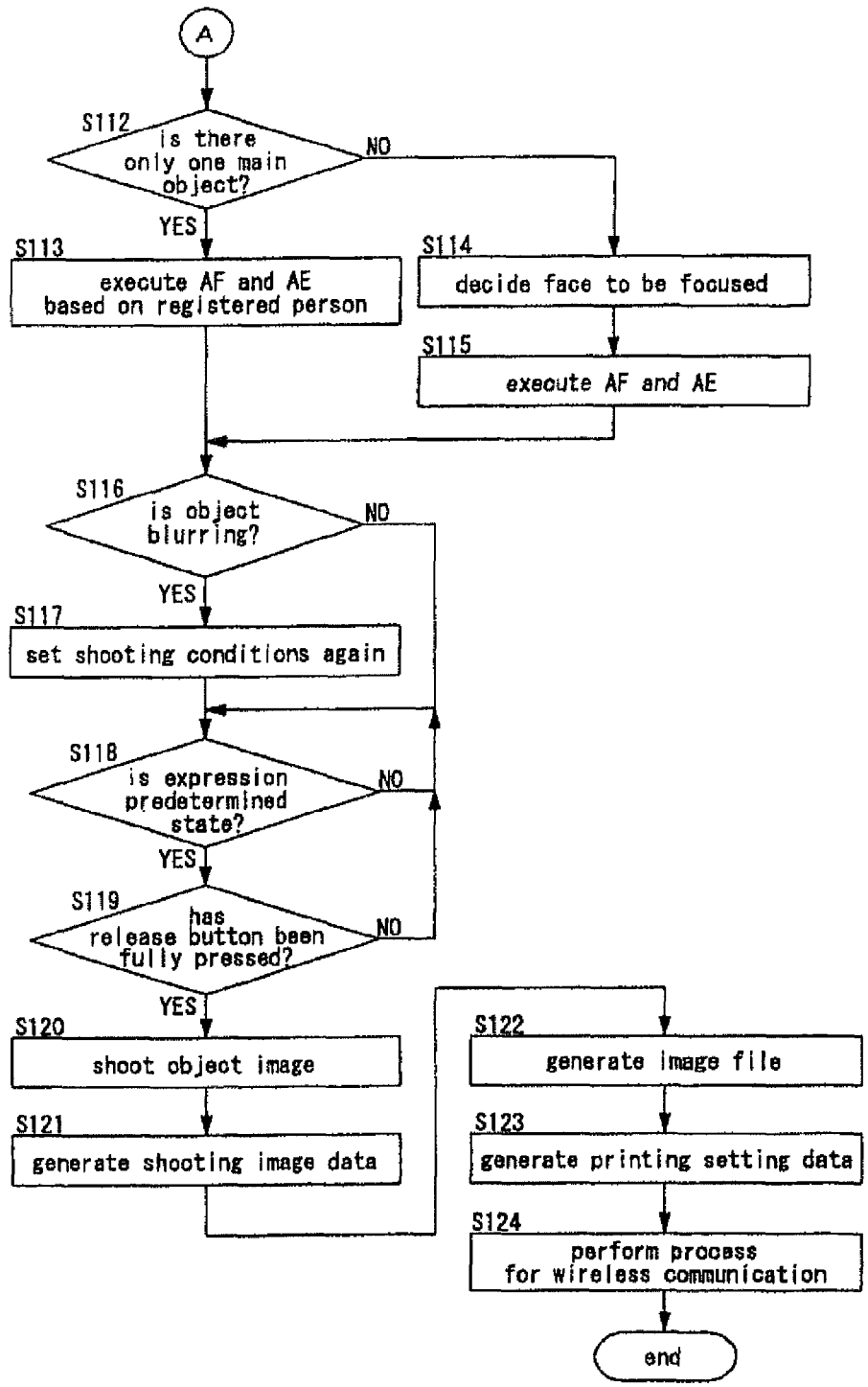
FIG. 3 is a flow chart describing an example of an operation in the shooting mode of the electronic camera according to this embodiment of the present invention.

Next, with reference to FIG. 2 and FIG. 3, an example of an operation in the shooting mode of the electronic camera of this embodiment will be described. In the following description, it is assumed that an object of a person is shot.

Step 101: First of all, the user sets the CPU 27 for the shooting mode and turns on the face recognizing function. When the user has set the CPU 27 for the shooting mode, the user can omit this step S101.

While the electronic camera has been set for the shooting mode, the user performs an operation of evoking a menu screen with the manipulation section 24. Thus, the CPU 27 causes the monitor 23 to display the menu screen. The user manipulates a cursor or the like on the menu screen with the manipulation section 24 to cause the CPU 27 to turn on the face recognizing function. Thus, the CPU 27 executes a face recognition based on face recognizing data. On the foregoing menu screen, the user can perform various types of setting for a main object (details will be described later).

Step 102: The CPU 27 drives the image pickup device 15 to start capturing a moving image. The image pickup device 15 pixel skipping reads an image signal of a moving image at intervals of a predetermined time period and obtains the image signal. The image processing section 20 successively generates a view image based on data of the moving image. In the shooting standby state, the monitor 23 displays a view image as a moving image. Thus, the user can frame an object with the view image on the monitor 23 to decide a shooting layout.

Step 103: The face detecting section 32 of the CPU 27 performs a face detecting process for the data of the moving image and detects a face area in a shooting image plane.

Step 104: The CPU 27 determines whether or not a face area has been detected in the face detecting process at S103. When a face area has been detected (YES side), the flow advances to S105. In contrast, when a face area has not been detected (NO side), the flow advances to S110.

Step 105: The face recognizing section 33 of the CPU 27 executes the face recognizing process of detecting a face of a registered person as a recognizing target in the face area based on data of characterizing points obtained in the face detecting process at S103 and face recognizing data of the second memory 28.

Step 106: The CPU 27 determines whether or not a face of a registered person has been detected in the face recognizing process at S105. When a face of a registered person has been detected (YES side), the flow advances to S107. In contrast, when a face of a registered person has not been detected (NO side), the flow advances to S109.

Step 107: The CPU 27 specifies a main object in objects corresponding to the face area as the result of the face recognizing process at S105. At this point, the CPU 27 can specify two or more persons as main objects. The user can change the number of main objects that the CPU 27 specifies by manipulating the manipulation section 24. This is because by adjusting the number of main objects, a shooting environment that the user wants can be accomplished. The number of main objects that the CPU 27 specifies can be set on the menu screen or the like.

Next, a method in which the CPU 27 specifies a main object will be specifically described.

First, the CPU 27 specifies a registered person as a main object.

Second, the CPU 27 further specifies an object in a face area that satisfies a predetermined condition in face areas that are not a registered person as a main object. Of course, if the number of main objects exceeds a predetermined upper limit, the CPU 27 omits this second step.

For example, in the second step, the CPU 27 further specifies a main object in other than a registered person in one of the following methods (1) to (3).

(1) The CPU 27 specifies as a main object a person whose object-distance nearly equals an object-distance of a registered person (this object-distance is referred to as the reference object-distance) in objects whose face areas have been detected. In other words, in this case, a person who is apart from a registered person in the shooting image plane and whose object-distance nearly equals that of the registered person is specified as main objects together with the registered person.

Specifically, the CPU 27 specifies a main object as follows. First, while the CPU 27 is causing the focus lens to scan in one direction and the image pickup device 15 to drive, the CPU 27 obtains a plurality of moving images. Thereafter, the CPU 27 obtains a contrast value of each of face areas of the moving images in the same manner as the AF calculation. The CPU 27 calculates the object-distance of each face area in the shooting image plane based on the position of the focus lens at which the contrast value becomes the highest in each face area. The CPU 27 specifies as a main object an object in a face area of which the difference between its object-distance and an object-distance of a registered person (reference object-distance) is within a threshold value.

(2) The CPU 27 specifies as a main object a person at a position apart from a registered person in a predetermined range in the shooting image plane in objects whose face areas have been detected (a face area apart from a face area of a registered person in the predetermined range). In other words, in this case, a person close to a registered person is specified as main objects together with the registered person.

(3) The CPU 27 specifies as a main object an object whose face area is equal to or larger than a predetermined threshold value in objects whose face areas have been detected. At this point, the CPU 27 specifies the foregoing threshold value based on the size of the face area of the registered person. For example, the CPU 27 may specify as a main object an object whose face area is larger than a face area of a registered person. In this case, a person considered to be present on the nearer the electronic camera than a registered person is specified as main objects together with a registered person. In addition, the CPU 27 can also specify as a main object an object whose face area is not largely different from that of a registered person. In this case, like (1) above, a person whose object-distance is considered to nearly equal that of a registered person can be specified as main objects together with the registered person.

Step 108: The CPU 27 causes the monitor 23 to display the face area detected at S103 and the main object specified at S107. Thereafter, the flow advances to S110.

Figure 4:
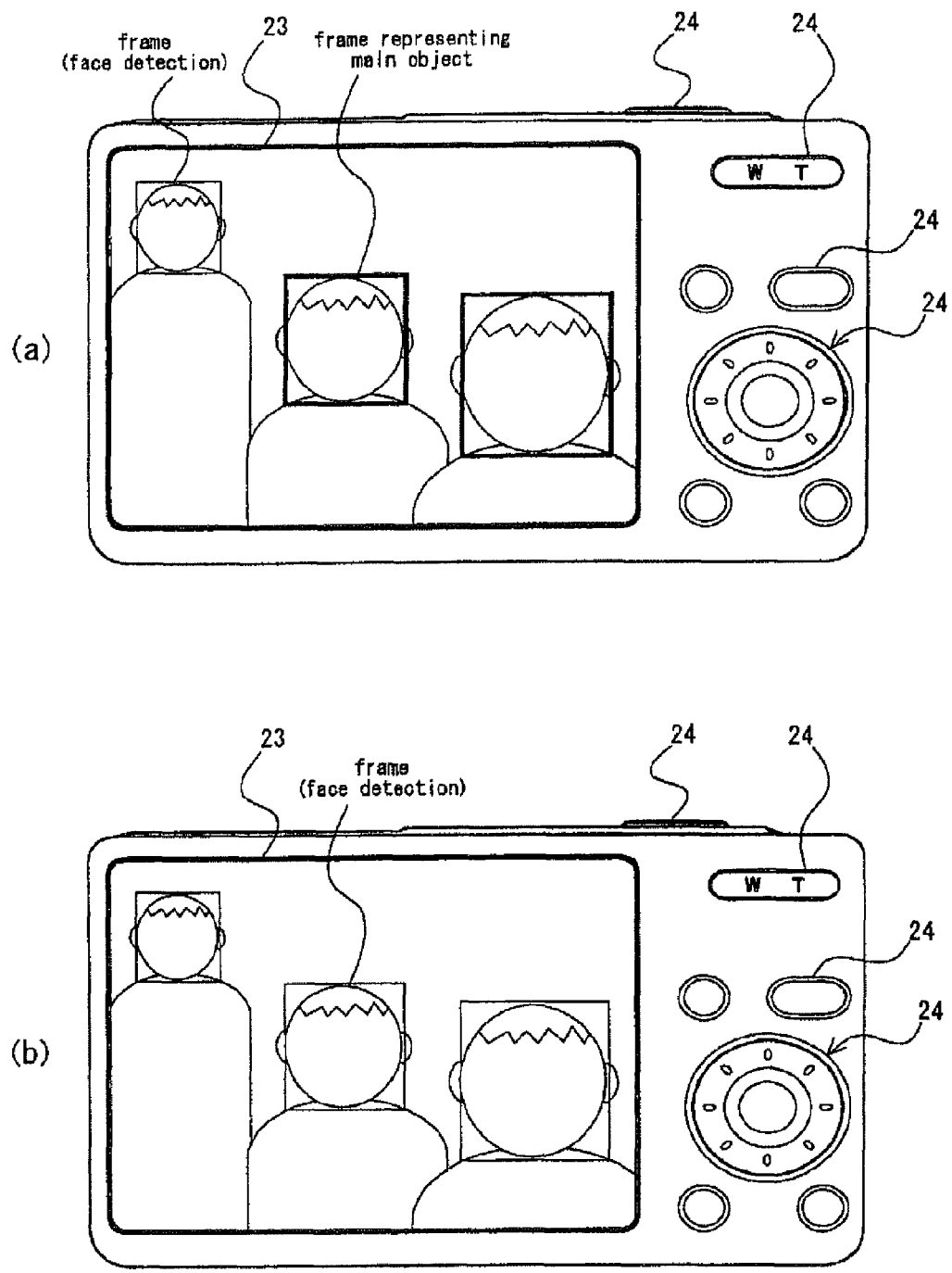
FIG. 4 is a schematic diagram showing an example of a representation of a view image when faces have been detected.

FIG. 4(a) shows an example of a representation of face areas and a main object on the monitor 23. In the example shown in FIG. 4(a), the CPU 27 causes the monitor 23 to superimpose square frames with face areas of the view image. The CPU 27 causes the monitor 23 to display a face area of a main object such that the thickness or color the face area of the main object are differ from those of other face areas. Thus, the user can check the result of the face detection and the main object specified by the CPU 27 with a view image. With a frame representation of a main object shown in FIG. 4(a), a frame of a registered person may be different from frames of other persons.

Step 109: The CPU 27 causes the monitor 23 to display only the face areas detected at S103. In this case, the monitor 23 displays the face areas nearly in the same manner as those displayed at S108 except that the monitor 23 does not display a main object.

Step 110: The CPU 27 determines whether or not the release button has been halfway pressed. When the release button has been halfway pressed (YES side), the flow advances to S111. In contrast, when the release button has not been halfway pressed (NO side), the flow returns to S102. At S102, the CPU 27 repeats the foregoing operation.

Step 111: The CPU 27 determines whether or not a main object has been specified at S107. When a main object has been specified (YES side), the flow advances to S112. In contrast, when a main object has not been specified (NO side), the flow advances to S125.

Step 112: The CPU 27 determines whether there is one main object or there is a plurality of main objects. When there is one main object (YES side), the flow advances to S113. In contrast, when there is a plurality of main objects (NO side), the flow advances to S114.

Step 113: The AF controlling section 31 of the CPU 27 executes an AF control and an AE calculation based on main objects (registered persons) specified at S107. Thereafter, the flow advances to S116.

Step 114: The CPU 27 decides a face to be focused in the main objects.

The CPU 27 limits a face to be focused to a face area of a registered person.

When there is one face of a registered person, the CPU 27 specifies as a face to be focused the face of the registered person. When there is a plurality of faces of registered persons, the CPU 27 specifies as a face to be focused a face considered to have the largest area and be present on the nearest side of the electronic camera or a face close to the center in the shooting image plane.

Step 115: The CPU 27 executes the AF control and the AE calculation based on the face of the main object (registered person) selected at S114. In this example, the CPU 27 may control the aperture 13 to widen a depth of field corresponding to the focus states of the faces of the main objects so that the faces of all the main objects are focused when the CPU 27 performs the AF calculation.

Step 116: The CPU 27 determines whether or not the face of any main object specified at S107 is blurring. When the face of any main object is blurring (YES side), the flow advances to S117. In contrast, when the face of any main object is not blurring (NO side), the flow advances to step S118. Depending on the setting on the menu screen, the CPU 27 may omit the determination of blurring of an object at S116. In this case, the flow advances to S118.

The detection of blurring of an object at S115 is performed by a known means. For example, if an object is moving, an afterimage occurs at an edge portion of the object. Thus, the CPU 27 extracts a high frequency component in spatial frequencies from the plurality of moving images and detects blurring of a main object based on variations of edge portions of the moving images. Instead, the CPU 27 may obtain areas whose patterns are matched in the moving images and detect blurring of an object based on the moving distance between the areas. As an algorithm of obtaining areas whose patterns are matched in images, for example sequential similarity detection method and structure matching method are known.

Step 117: The CPU 27 sets shooting conditions such as shooting sensitivity and f-number for a shorter exposure time to suppress blurring of the object. Thus, the possibility that shooting fails due to blurring of an object as moving of a main object decreases. Since the CPU 27 does not detect blurring of other than a person of a main object, the CPU 27 does not change shooting conditions by moving of other than a person of a main object.

Step 118: The CPU 27 estimates the expression of the face of the main object based on the detected state of characterizing points of the face in the face area. The CPU 27 determines whether or not the expressions of the faces of all the main objects are predetermined states (for example, closing eyes or smiling). When the foregoing condition has been satisfied (YES side), the flow advances to S119. In contrast, when the foregoing condition has not been satisfied (NO side), the CPU 27 waits until the expressions of all the main objects have become the predetermined states. At this point, the CPU 27 may cause the monitor 23 to display an alarm about the expressions of the main objects. Depending on the setting on the main screen, the CPU 27 may omit the process of step S118.

At this point, the expressions of the faces are detected at S118 by a known means. As described, for example, in Japanese Unexamined Patent Application Publication No. 2004-272933, learning face images categorized as classes of normal face expression, face with eyes closed, face with open mouth, smiling face, and so forth may be prepared. After the CPU 27 has identified the expression of a face according to canonical discriminant analysis, the CPU 27 may determine the expression of the face based on an evaluation value preset for each class. Instead, standard patterns of open eyes, closed eyes, open mouth, closed mouth, and so forth may be prepared. The CPU 27 may match each of the prepared patterns with the face area and estimate the expression of the face in combinations of the patterns.

When the result at S118 is NO, the CPU 27 does not permit shooting until the expression of the face of the main object has changed. Thus, the user can shoot a main object in the state that the expression of the main object matches user's desired condition. As a result, the possibility that the user fails to shoot a main object decreases. In addition, since the CPU 27 does not estimate the expression of other than a person of a main object, the shooting of the electronic camera is not restricted by other than a person of a main object.

Step 119: The CPU 27 determines whether or not the release button has been fully pressed. When the release button has been fully pressed (YES side), the flow advances to step S120. In contrast, when the release button has not been fully pressed (NO side), the flow returns to S118.

Step 120: The CPU 27 drives the image pickup device 15 to shoot an image of the object.

Step 121: The CPU 27 causes the image processing section 20 to generate data of the shooting image. As described in (1) to (8) below, the image processing section 20 may perform an image process such that the image process for the area corresponding to the main object (specified at S107) of the shooting image is different from that for the other areas. The CPU 27 can change the on/off states of the following image processes depending on setting on the menu screen.

(1) The image processing section 20 performs an edge enhancing process such that the edge enhancing process for an area of a main object is different from that for the other areas. For example, the image processing section 20 performs the edge enhancing process for the area of the main object of the shooting image with an edge enhancing filter that is weaker than that for the other areas. As a result, a favorable shooting image of a person of a main object whose skin disorder is less remarkable can be obtained.

(2) The image processing section 20 performs a gradation correction such that the gradation correction characteristics of the area of a main object are different from those of the other areas. For example, the image processing section 20 executes the gradation correction by applying different gradation characteristic tables for the area of the main object of the shooting image and for the other areas in their gradation curves. Specifically, the image processing section 20 applies a characteristics table having a softer gradation curve for the area of the main object so that the contrast of the area of the main object becomes lower than that of the other areas. As a result, a favorable shooting image of which the face of the main object is soft can be obtained.

(3) The image processing section 20 corrects color saturation such that the color saturation for the area of the main object becomes higher than that for the other areas. For example, the image processing section 20 sets the parameter of the color saturation such that the value of the parameter for the area of the main object becomes higher than that for the other areas. As a result, a favorable shooting image of which the dullness of the skin color of the person of the main object is reduced can be obtained.

(4) The image processing section 20 executes a light volume correcting process of adjusting the gradation of a dark portion or a highlight portion of an image of the area of the main object as the result of the image analysis. The light volume correcting process is performed by a known technique disclosed, for example, in Japanese Unexamined Patent Application Publication No. 2006-5699. Specifically, the image processing section 20 extracts a local variation component from a shooting image and generates a locally varying image containing the variation component. Next, the image processing section 20 obtains a modulation signal that modulates the shooting image into the locally varying image and compresses the level of the modulation signal. Thereafter, the image processing section 20 modulates the shooting image with the modulation signal that has been level-compressed and obtains a gradation corrected image. As a result, a favorable image of which dark and bright variation in the correction range is properly suppressed and of which gradation that is visually buried in the background is corrected can be obtained. In particular, when shooting is performed against the sun or when flash-light does not sufficiently reach a person in flash-shooting, the shooting image can be properly corrected. When the image process for other than the area of the main object is partly omitted, the calculating time can be shortened.

(5) The image processing section 20 performs a noise reduction process such that the noise reduction process for the area of the main object is different from that for the other areas. For example, the image processing section 20 executes the noise reduction process only for the area of the main object of the shooting image with a median filter or the like. As a result, a granular appearance of the face of the main object can be suppressed. When the image process for other than the area of the main object is partly omitted, the calculating time can be shortened.

(6) The image processing section 20 performs a red-eye reduction correction as an image process for only the area of the main object. The red-eye reduction correction is performed by a known technique disclosed, for example, in Japanese Unexamined Patent Application Publication No. Hei 10-233929. Specifically, the image processing section 20 detects a red-eye area from the face area and corrects the detected red-eye area so that the brightness or color saturation of the detected red-eye area decreases. As a result, red eyes can be prevented from appearing in the main object. When the image process for other than the person of the main object is partly omitted, the calculating time can be shortened.

(7) The image processing section 20 performs a blurring reduction correction only for the area of the main object. For example, the image processing section 20 performs an unsharp mask process for the area of the main object to alleviate hand-blurring or focus-shifting. As a result, the focus-shifting and blurring of the main object can be alleviated to some extent. When the image process for other than the area of the main object is partly omitted, the calculating time can be shortened.

(8) The image processing section 20 performs a soft focus process only for the area of the main object of the shooting image. As a result, the main object is enhanced. In addition, a soft shooting image can be favorably obtained.

The soft focus process of the image processing section 20 is performed by the following means. For example, the image processing section 20 performs a filter process for the shooting image for example with a low pass filter or a filter having a predetermined soft focus effect and thereby generates a soft focus image. Instead, the image processing section 20 may generate a mask image from a shooting image and combine the filtered image and the original image based on the mask image, resulting in generating a soft focus image.

Step 122: The CPU 27 generates an image file based on the Exif (Exchangeable image file format for digital still cameras) standard. The CPU 27 generates data of a header of an image file using a work area of the first memory 19 or the second memory 28. For example, together with data of shooting conditions (exposure time, f-number, shooting sensitivity, and so forth) of the shooting image, the CPU 27 records data that represent the position of a main object specified at S107 and data that represent a registered person to the header using a MarkerNote tag. Data of the position of the main object and so forth recorded in the header are used when the user performs an image process (same process as S121) for the main object that has been shot. The CPU 27 correlates the data of the shooting image with the data of the header, generates an image file, and finally records the image file to the record medium 30.

Step 123: The CPU 27 generates printing setting data for the image file generated at S122 based on the DPOF standard. Depending on the setting on the menu screen, the CPU 27 may omit the process of S123.

Specifically, the CPU 27 specifies an image file of a shooting image to be printed. In addition, the CPU 27 counts the number of main objects in the shooting image and specifies the number of prints for the printing setting data. In addition, the CPU 27 specifies the print size (L, 2L, etc.) of the printing setting data depending on the setting on the menu screen. Instead, the CPU 27 may read printing setting for a registered person detected at S105 from the second memory 28 and specify the number of prints and the print size for the printing setting data.

Step 124: The CPU 27 correlates the image file generated at S122 with address data for wireless communication and transmits the image file to the outside through the communicating section 25. Depending on the setting on the menu screen, the CPU 27 may omit the process of S124 and complete a sequence of steps of the shooting operation.

Specifically, the CPU 27 reads the transmission setting for the registered person detected at S105 from the second memory 28. When the transmission setting for the shooting image has been set to the ON state, the CPU 27 causes the communicating section 25 to transmit the image file to a recipient represented by the address data. In contrast, when the transmission setting for the shooting image has been set to the OFF state, namely the wireless communication is not enabled, the CPU 27 may record the address data to the header of the image file.

Step 125: In this case, the CPU 27 executes AF and AE according to the same algorithm as it performs the regular shooting. When the release button has been fully pressed, the CPU 27 shoots the object and generates shooting image data. As a result, the operation of the shooting mode is completed.

Next, effects in the shooting mode of the electronic camera of this embodiment will be described.

In the foregoing shooting mode, the electronic camera performs the shooting control, image processes, and so forth on the basis of a main object specified as the result of a face recognition. In addition, the electronic camera can automatically generate printing setting data of data of a shooting image whose main object has been specified and transmit the data of the shooting image to the outside through wireless communication. Thus, according to this embodiment, an electronic camera that is functional and user-friendly can be accomplished.

When the CPU 27 specifies a main object, the CPU 27 detects a registered person by the face recognizing process and specifies the registered person as the main object. Depending on shooting scenes, together with a registered person, the CPU 27 can specify as main objects a person that it can estimate that the user wants to treat the person in the same manner as a registered person. Thus, according to this embodiment, a shooting image that follows the intention of the user can be easily obtained.

Figure 5:
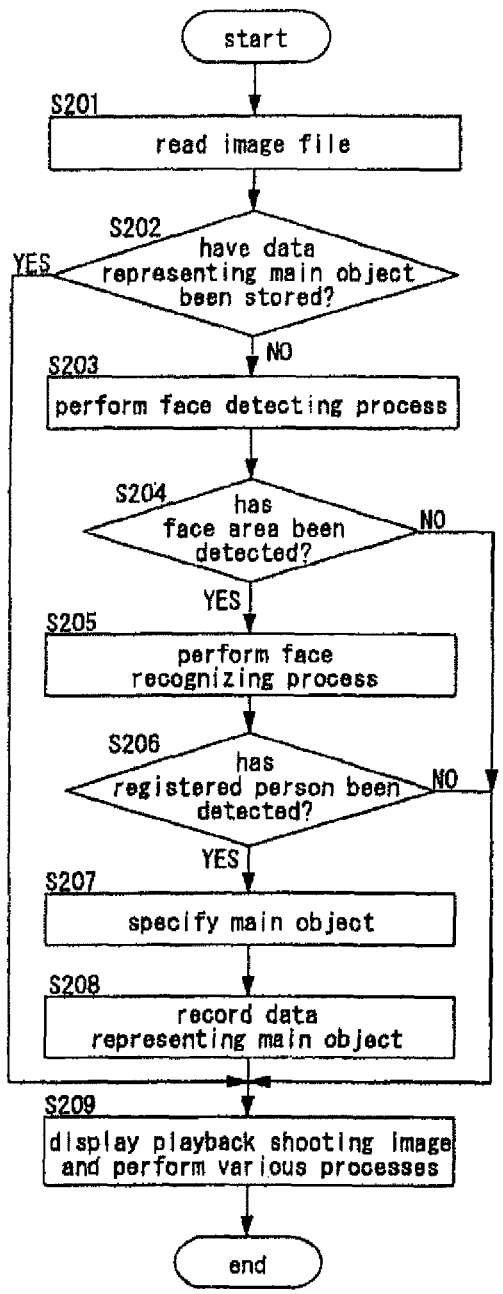
FIG. 5 is a flow chart describing an example of an operation in an editing mode of the electronic camera according to this embodiment of the present invention.

Next, with reference to FIG. 5, an example of an operation in the editing mode of the electronic camera of this embodiment will be described. In the editing mode, image files that have been recorded to the record medium 30 or the like according to the Exif standard are played back. The CPU 27 starts the editing mode in the state that the electronic camera is operating in the shooting mode when the CPU 27 accepts an input of the release button. Instead, depending on a mode selection operation of the user, the CPU 27 may directly start the editing mode not through the shooting mode.

Step 201: The CPU 27 reads an image file that the user has specified from the record medium 30 through the recording I/F 21 or from an external device (not shown) through the external I/F 26. An image file that the CPU 27 reads at S201 may have been generated by another electronic camera as long as the standard based on which the image file has been creased complies with the standard for image files generated by the electronic camera of this embodiment.

Step 202: The CPU 27 determines whether or not the image file read at S201 contains data that represent the position of a main object and data that represent a registered person. Data that represent the position of the main object and so forth correspond to data recorded in the header at S122 in the shooting mode. When the image file contains the data (YES side), the flow advances to S209. In contrast, when the image file does not contain the data (NO side), the flow advances to S203.

Step 203: The CPU 27 executes the face detecting process for the data of the shooting image.

Step 204: The CPU 27 determines whether or not a face area has been detected in the face detecting process at S203. When a face area has been detected (YES side), the flow advances to S205. In contrast, when a face area has not been detected (NO side), the flow advances to S209.

Step 205: The face recognizing section 33 of the CPU 27 executes the face recognizing process of detecting a face of a registered person as a recognizing target from face areas based on data of characterizing points obtained in the face detecting process at S203 and the face recognizing data stored in the second memory 28.

Step 206: The CPU 27 determines whether or not a face of a registered person has been detected in the face recognizing process at S205. When a face of a registered person has been detected (YES side), the flow advances to S207. In contrast, when a face of a registered person has not been detected (NO) side, the flow advances to S209.

Step 207: The CPU 27 specifies a main object in objects corresponding to face areas as the result of the face recognizing process at S205. The CPU 27 specifies a main object nearly in the same manner as it does at S107 except that it specifies a main object not based on object-distances. To prevent redundancy, the description of this method will be omitted.

Step 208: The CPU 27 records data that represent the position of the main object specified at S207 and data that represent a registered person to the header of the image file. Instead, the CPU 27 may generate a file that contains the data that represent the position of the main object specified at S207 and so forth besides the image file read at S201. Thus, the CPU 27 can use the data that represent the position of the main object specified at S207 and so forth when the CPU 27 reads the image file the next time.

Figure 6:
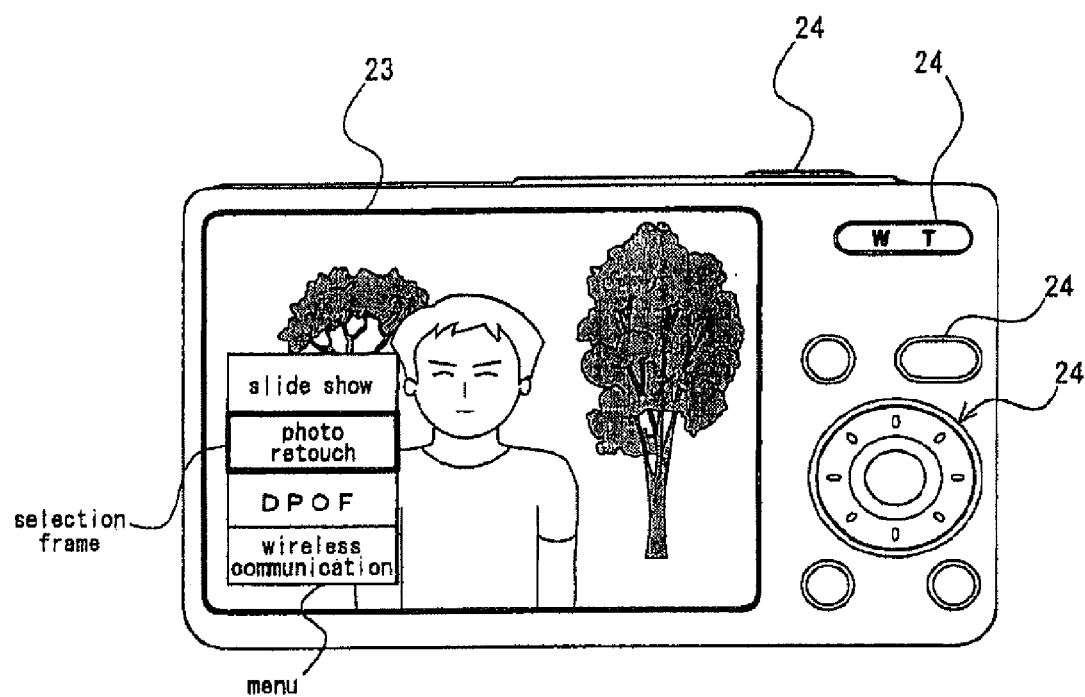
FIG. 6 is a schematic diagram showing an example of a representation of a menu on a monitor in the editing mode.

Step 209: The CPU 27 plays back the shooting image data and causes the monitor 23 to display the playback shooting image data. At this point, the CPU 27 causes the monitor 23 to display a menu in the GUI format as shown in FIG. 6. The CPU 27 accepts a menu item that the user has selected and input on the menu. Examples of menu items of the menu include slide show, image process, printing setting data generation, and wireless communication. The CPU 27 executes one of various types of processes corresponding to a menu item that the user has selected on the menu. Like the case shown in FIG. 4, for an image file in which a main object has been specified, a mode in which the CPU 27 superimposes a frame that represents the main object with a playback image may be provided (frames are not shown in FIG. 6).

Next, each menu item will be described in details.

(1) Slide Show

When slide shown is selected as a menu item on the menu, the CPU 27 executes a slide show of image files by successively playing back shooting images of a plurality of image files (for example, all image files recorded in the record medium 30). In the slide shown, the CPU 27 performs the following processes for an image file in which a main object has been specified.

In proportion to the number of main objects contained in a shooting image, the CPU 27 increases the display time for a shooting image of the slid show. In addition, the CPU 27 may execute a slide shown with special effects based on the position of a face of a main object. For example, the CPU 27 may cause the monitor 23 to zoom up or down, rotate, fade in or out an image based on the position of the face of the main object.

When a shooting image contains faces of a plurality of main objects, the CPU 27 may execute a slide show by dividing the shooting image into portions corresponding to the number of persons of main objects. For example, the CPU 27 executes a slide show for example by a means of enlarging faces of main objects. When the second memory 28 has stored playback display setting data of a registered person as a main object, the CPU 27 may execute a slide show based on the playback display setting data.

(2) Photo Retouch

When photo retouch has been selected as a menu item on the menu, the CPU 27 causes the image processing section 20 to perform an image process for data of a shooting image. The image processing section 20 executes the edge enhancing process, gradation correction, color saturation adjustment, light volume correcting process, noise reduction process, red-eye reduction correction, blurring reduction correction, and so forth. Like the process of S121, the image processing section 20 performs the image processes such that the image processes for an area of a main object of a shooting image are different from those for the other areas. Since these processes have been described at S121, for prevent redundancy, these descriptions will be omitted.

(3) DPOF

When DPOF has been selected as a menu item on the menu, the CPU 27 generates printing setting data for an image file to be played back on the basis of the DPOF standard. For an image file in which a main object has been specified, the CPU 27 counts the number of persons of main objects and automatically specifies the number of prints for the printing setting data. When printing setting data for a registered person as a main object has been stored in the second memory 28, the CPU 27 may read the printing setting for the registered person from the second memory 28 and specify the number of prints and the printing size of the printing setting data.

(4) Wireless Communication

When wireless communication has been selected as a menu item on the menu, the CPU 27 transmits an image file to be played back to the outside of the electronic camera through the communicating section 25. When address data have been recorded in the header of the image file, the CPU 27 transmits the image file based on the address data. When transmission setting data for a registered person as a main object have been stored in the second memory 28, the CPU 27 may read the address data from the second memory 28 and transmit the image file to be played back to the outside of the electronic camera. As a result, the operation of the editing mode is completed.

Next, the effects in the editing mode of the electronic camera of this embodiment will be described.

In the editing mode, the electronic camera can perform image processes and execute a slide show based on a main object specified as the result of the face recognition. In addition, the electronic camera can generate printing setting data for shooting image data in which a main object has been specified and wirelessly transmit the data of the shooting image to the outside. Thus, according to this embodiment, an electronic camera that is functional and user-friendly can be accomplished.

Particularly, in the editing mode of this embodiment, even if an image file does not contain data that specify a main object, the CPU 27 can perform the face recognizing process for shooting image data to specify a main object. Thus, even if an object has been shot without recognizing a face, since the same effects as the electronic camera does in the shooting mode can be obtained, the user-friendliness of the electronic camera can be further improved.

When a main object is specified in the editing mode, the CPU 27 performs the face recognizing process for a shooting image, detects a registered person, and specifies the registered person as a main object. In addition, along with a registered person, the CPU 27 can specify as main objects a person that it can estimate that the user treats the person as a registered person due to the layout of the shooting image. Thus, according to this embodiment, a main object that follows the intention of the user can be specified.

(Supplementary Description of Embodiment)

(1) In the foregoing embodiment, the electronic camera that detects a face with the image pickup device 15 that captures a shooting image was described. However, the present invention is not limited to such an example of the foregoing embodiment. For example, in a single-lens reflex type camera, a focus detecting mechanism, an optical finder, or the like may be provided with an image pickup device that detects a face. In this case, the present invention can be applied to such a single-lens reflex type camera.

(2) In the foregoing embodiment, an example of an electronic camera that plays back an image was described. However, according to the present invention, an image processing apparatus that executes the same process as the editing mode of the electronic camera of the foregoing embodiment may be structured by a playback-only apparatus (viewer) that has a function of playing back an image file or a general-purpose computer that executes an image playback program.

(3) In the shooting mode of the foregoing embodiment, when the release button has been halfway pressed as a trigger, the CPU 27 may perform the face detecting process, face recognizing process, and so forth.

(4) In the editing mode of this embodiment, the CPU 27 may cause an external display apparatus (for example, a television set) to display an image through a video terminal of the displaying I/F 22.

(5) It is not always necessary to match the structure of the electronic camera of the present invention with that of the foregoing embodiment. For example, the first memory 19 and the system bus 29 may be structured as a common memory. In addition, a part of the structure of the electronic camera of the embodiment, for example the communicating section 25, may be omitted.

The invention is not limited to the above embodiments and various modifications may be made without departing from the spirit and scope of the invention. Any improvement may be made in part or all of the components.

What is claimed is:

1. An electronic camera, comprising:
    a recognizing unit which recognizes a face of a person and a face of an animal based on recognizing data which is generated by a shooting; and
    a controlling unit which categorizes i) the recognizing data that is generated by the shooting and is used for recognizing the face of the person and ii) the recognizing data that is generated by the shooting and is used for recognizing the face of the animal as a group and records the group in a memory unit.

2. The electronic camera according to claim 1, wherein the recognizing data is data regarding the face of each of the person and the animal.

3. The electronic camera according to claim 1, wherein the memory unit records the recognizing data which the recognizing unit uses to recognize the face of the person and the face of the animal.

4. The electronic camera according to claim 1, wherein the controlling unit categorizes face recognizing data which is related to a characteristic point of each of the person and the animal as the group, and records the group in the memory unit.

* * * * *